United States Patent [19]

Thicthener et al.

[11] Patent Number: 5,152,945

[45] Date of Patent: Oct. 6, 1992

[54] HIGH STRENGTH FIBER REINFORCED POLYMERIC FASTENERS HAVING THREADS, FOR EXAMPLE A NUT AND BOLT

[75] Inventors: Edward P. Thicthener, West Lakes Shore; Stan Pomorski, Winvale; Michael G. Clements, Hindmarsh; Peter J. Hastwell, North Adelaide, all of Australia

[73] Assignee: Applied Research of Australia Pty. Ltd., Technology Park, Australia

[21] Appl. No.: 541,270

[22] Filed: Jun. 20, 1990

[51] Int. Cl.[5] .............................................. B29C 67/00
[52] U.S. Cl. .................................... 264/136; 156/180; 264/257
[58] Field of Search ............... 264/257, 258, 317, 314, 264/135, 136, 137; 156/180, 181

[56] References Cited

FOREIGN PATENT DOCUMENTS

| | | |
|---|---|---|
| 5243186 | 7/1986 | Australia . |
| 7631487 | 2/1988 | Australia . |
| 2-162020 | 6/1990 | Japan .................................. 264/257 |
| 2-162021 | 6/1990 | Japan .................................. 264/257 |
| 2-162022 | 6/1990 | Japan .................................. 264/257 |
| 2-286226 | 11/1990 | Japan .................................. 264/258 |

*Primary Examiner*—Jay H. Woo
*Assistant Examiner*—Scott Bushey
*Attorney, Agent, or Firm*—Edward W. Callan

[57] ABSTRACT

In the production of a fastener, reinforcing fibers (20) are wetted out in a bath (22) of thermoset resin, drawn together into a wetted cable (23) which is placed in a 'U'-shaped die recess of a first die part (24), having parallel inner side walls (25), a second part (29) of the molding die having side walls (30) and a concave die surface then closes the recess by slidably engaging the parallel inner side walls (25), and pressure is applied to the wetted cable without expulsion of wetted fibers. Both die parts (25, 29) have die surfaces which include contours (31) of fastener surfaces, which may be outstanding threads, or annular buttress type projections radiating from the shank .

14 Claims, 8 Drawing Sheets

HIGH STRENGTH FIBER REINFORCED POLYMERIC FASTENERS HAVING THREADS, FOR EXAMPLE A NUT AND BOLT

This invention relates to a threaded polymeric fastener.

BACKGROUND OF THE INVENTION

There are many examples wherein there is a requirement for polymeric fastener, particularly in underground mining, chemical plant installation and marine work. The requirement for polymerics in underground mining is to avoid the tedious withdrawal of rock bolts, which, if polymeric, can be cut away by a mining machine along with the rock. For chemical, aerospace and marine applications, polymeric fasteners are required for anticorrosion properties, stainless steel quite often being only partially valuable, in certain circumstances corroding and in some circumstances being subject to stress corrosion which makes stainless steel an unreliable material in these applications. Titanium is an alternative metal which can be used in many instances because of its excellent anticorrosive and strength properties but titanium is a very expensive metal. Another requirement is light weight, particularly for aerospace applications, steel rock bolts for example often being too heavy for easy handling.

Many attempts have been made to utilize polymeric fasteners, the most usual construction being a bolt having a plurality of longitudinally extending reinforcing fibers, the thread of the bolt being out with a diamond cutting tool which can form the threads without excessive wear, but in cutting through some of the fibers the diamond cutting tool removes the continuity of the tensile reinforcements at the locality of the threads, that is, where they are most needed. It has already been established that under average fastener conditions wherein linear elastic metals having isotropic properties are used, e.g. mild steel, and the male and female threads have identical pitches, upon a tensile stress being applied to the nut, between 30% and 60% of the stress is taken by the first thread. Various provisions are sometimes made to spread the load, for example by having the pitch of the female threads slightly greater than the pitch of the male thread, but even with the efforts which have been made there is still an excessive compression of the first female thread and stretching of the first male thread, and thread failure is likely to occur in prior art polymeric bolts in domino fashion. It should be noted that a continuous unidirectional fiber reinforced plastic has a generally straight line stress strain relationship to failure, and does not have the advantage of most metals of deforming slightly when it reaches a yield point. Thus for example, the best available prior art plastic nut/rod combination known to the applicants has an ultimate strength of only 100 kN. Ordinary mild steel rod of the same shank diameter has a yield point of about 95 kN and an ultimate tensile strength of about 140 kN.

PRIOR ART

Australian patent application 76314/87 (DuPont) discloses a polymeric tensionable dowel which receives a nut with a frangible flange which fractures upon tightening the nut so as to indicate proper dowel retention. To retain the dowel in a rock hole, its shank has a profile such as commonly used with steel rock bolts, and, as with steel rock bolts, upon rotation this agitates bonding resin within the rook hole to effect a bond between the shank and rock hole surface.

Australian patent application 52431/86 (Isler et al) (and U.S. Pat. No. 4,523,880, both describe a rock borehole anchor having a plurality of spreading bolts with wedge surfaces to engage a rock hole surface. The anchor has a threaded sleeve glued to one end.

Further relevant prior art exists in U.S. Pat. No. 3,837,258. (Williams)

If resin wetted glass fibers or other fiber reinforced plastic is subjected to pressure during its setting phase to prevent voids and remove excess resin, the tensile strength is increased by a useful amount. However, any projections outstanding from a shank, such as threads or ribs, make it necessary for the molding die to have re-entrant surfaces unless the die part plane lies across the central axis of the fastener. A serious difficulty occurs however, in that application of pressure to the cable of wetted fibers in the regular die arrangement referred to above will cause wet fibers to be expelled from the die space and lodged between the faces at the die part plane.

The main object of the invention is to overcome these two associated problems.

There is a further problem when the fastener has a thread, in that, utilizing prior art methods of production, upon excessive tensile or torsional forces being applied, the unreinforced thread projections fail under much lower loads than those which can be resisted by the fastener shank. A further object of the invention is to provide a method of production, and a fastener produced by that method, wherein some of the fibers are forced out from the shank into such projections. A still further object is to provide a method of production wherein a threaded end can be of larger diameter than the remainder of the shank.

BRIEF SUMMARY OF THE INVENTION

In one embodiment of this invention, reinforcing fibers are wetted out in a bath of thermoset resin, drawn together into a wetted cable which is placed in a 'U'-shaped die recess of a first die part, having parallel inner side walls, a second part of the molding die having side walls and a concave die surface then closes the recess by slidably engaging the parallel inner side walls, and pressure is applied to the wetted cable without expulsion of wetted fibers. Both die parts have die surfaces which include contours of fastener surfaces, which may be outstanding threads, or annular buttress type projections radiating from the shank.

In those embodiments of the invention wherein the fastener surfaces are surfaces of a thread at one end of the shank, the fastener may be expanded by a male insert located centrally within the wet fibers which urges some of the fibers into the female thread so that at least some of the fibers partly follow contours of the thread. The insert is forced into the die while the die is closed and under pressure. Forcing the reinforcing fibers into the threads so that they follow the contours thereof has the effect of increasing the thread strength very considerably. The male insert may comprise circular dowel driven into the end of the rod before the resin sets, the dowel may itself have thread contours of the same pitch as but smaller diameter than the female thread and can be screwed in, or the insert may comprise settable polymeric material. It may remain in the rod during setting of the resin. When the fastener is expanded at one end by an insert, it is possible to utilise the conventional die arrangement wherein the die parts are separable about a part-plane which is normal to the shank, thereby avoiding the re-entrant surfaces.

More specifically, the method of producing a fiber reinforced polymeric fastener having a male thread comprises the following steps:

(a) wetting out a plurality of reinforcing fibers with polymeric thermoset resin, (b) drawing the wetted fibers together to form a wetted coherent cable, (c) inserting the wetted coherent cable at least partly into a recess in a 'U'-section molding die first part, said recess having parallel inner side walls and a first concave die surface in a base portion joining the inner side walls, the base portion comprising matching contours of said fastening surfaces near one end of the recess, (d) closing a second movable part of said molding die with respect to said first part, said second part having outer side walls which slidably engage the parallel inner side walls of the recess and a second concave die surface joining said parallel outer side walls, said second die surface also comprising matching contours of said fastening surfaces at said one end, applying pressure between the die parts to the conform the resin to said matching contours, and cause the fibers to at least partly conform, with said matching contours, and, (e) setting allowing the resin opening the molding die, and removing the fastener from the die.

In a further embodiment a male insert expands an end of the wetted coherent cable when the die is closed.

If the male insert is a circular dowel, it is inserted by driving in from one end of the die.

If the dowel has thread contours as described, it is inserted by screwing into the wetted fibers from the die end.

If the male insert is a settable polymeric material, it is inserted by injecting into the end of the die. Although it is necessary for the injection nozzle to be inserted before setting of the resin, so as to force some of the reinforcing fibers into the contours of the fastener surfaces of the die, it is not always essential to withdraw the nozzle and inject the polymeric material before the resin has set.

The invention does not necessarily require the steps to be in the sequence set out in the claims.

The invention also provides a means whereby a nut can have its threads considerably increased in strength, and in an embodiment of the invention the nut is formed by firstly laying fibers on the thread profile of a mandrel to increase the strength in both the longitudinal and circumferential directions (to respectively resist tensile and hoop stresses in the nut), the mandrel is inserted in a die which is closed over settable resin, the die providing the nut outer profile, the die 13 is opened, and the mandrel and nut are removed. Conveniently a woven or braided material may be used to provide the required tensile and shear strengths for the nut thread, and the overlying strand can provide further hoop strength. It is not always necessary to pre-wet the thread profile fibers, if pressure, or heat and pressure, are applied to the resin. The nut may be molded with a dough (bulk) molding compound or a sheet molding compound. Either may comprise vinylester or polyester resin and catalyst, respectively with up to 20% glass, or 70% glass fiber reinforcement by weight.

As explained above, there is a need particularly in fiber reinforced plastics, to spread thread load over a larger number of threads. In another embodiment of this invention, the threaded rod (male portion) of the fastener is formed from a fiber reinforced plastics material which has a higher modulus elasticity than the modulus of the nut, and in such an instance dough or sheet molding compound can meet the strength requirements of the nut.

In mining applications, a bolt shank is frequently grouted to the walls of a predrilled hole in the wall of a shaft, with a two pot mix cement or a catalysed filled resin. To effect mixing of the cement or grout (which has a very short life before setting), the shanks are often provided with outstanding ribs, and are rotated. Sometimes the grout fails, and this had been found to be associated with poor mixing. In an embodiment of this invention, ribs extending around a shank are discontinuous and are staggered, and this greatly improves mixing. They may be generally alternate left hand and right hand helixes. If a small section near the fastener end has a single helix direction, say left hand, the effect of shank rotation in a bore hole is to pump the cement or filler resin inwardly.

BRIEF DESCRIPTION OF THE DRAWING

Embodiments of the invention are described hereunder in some detail with reference to and as illustrated in the accompanying diagrammatic representations, in which.

DETAILED DESCRIPTION OF THE PREFERRED EMBODIMENT

Figure 1:
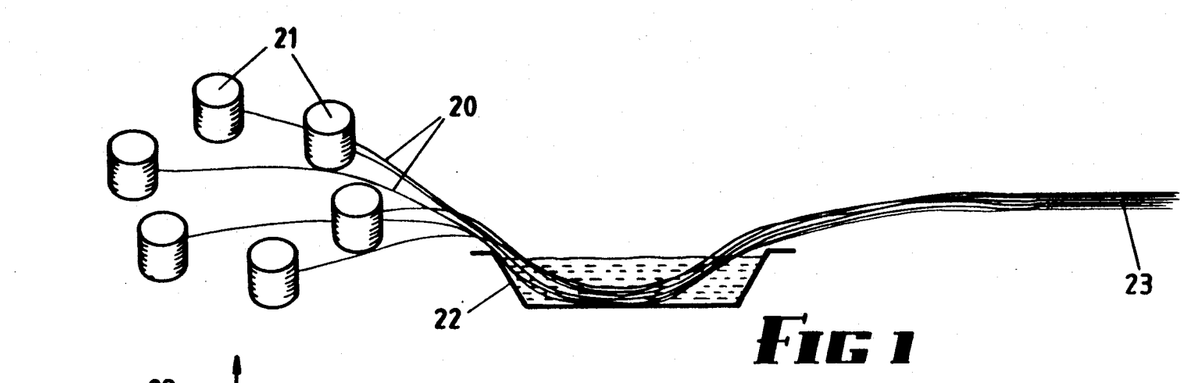
FIG. 1 diagrammatically shows step (a), that is, wetting out a plurality of reinforcing fibers to create a wetted coherent "cable"

Referring first to FIG. 1, a plurality of strands of glass fiber 20 are unwound from their reels, 21, and passed through a bath 22 of catalyzed resin. This is stage (a) of the claimed method. Suitable resins include vinylester, polyester epoxy or phenolic and may contain pigment or fillers, as required to provide further properties, such as electrical conductivity, fire retardency or reduced density. The wetted strands are drawn out to form a coherent wetted cable 23.

Figure 11:
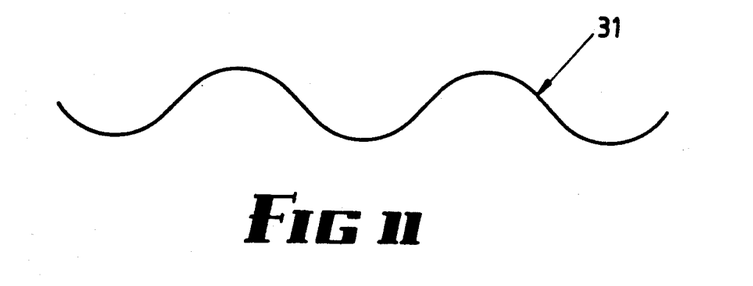
FIG. 11 shows a thread form preferred in this invention.
Figures 12, 13:
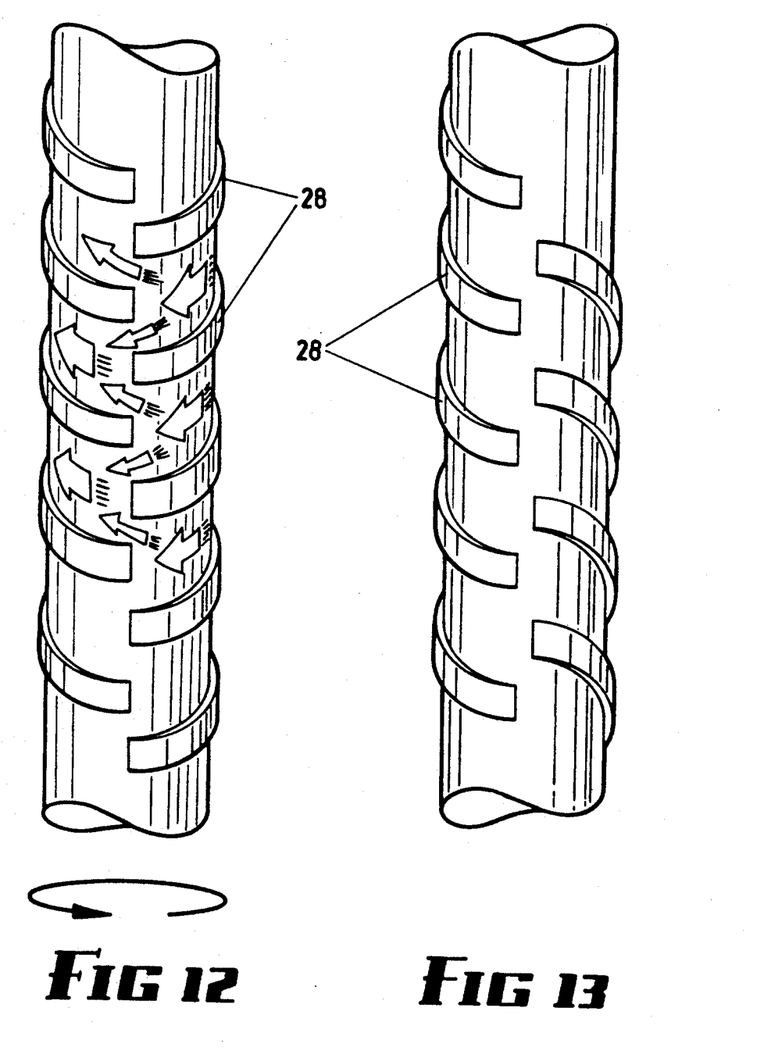
FIG. 12 is a perspective view showing a first rib configuration surrounding portion of a rod which is not threaded.
FIG. 13 is a perspective view showing a second rib configuration.

The next stage is to place cable 23 into an open molding die 24, the open die 24 having an internal 'U'-shape which includes inner parallel side walls 25, a concave base 26 joining the inner side walls 25, and containing recesses 27 for the formation of outstanding projections 28 as shown in FIGS. 12 and 13, the die including at least one movable die part 29 having parallel side walls 30 which slidably engage the inner side walls 25. Each die part has a thread form 31 the contour of which is generally sinusoidal as shown in FIG. 11.

Figure 2:
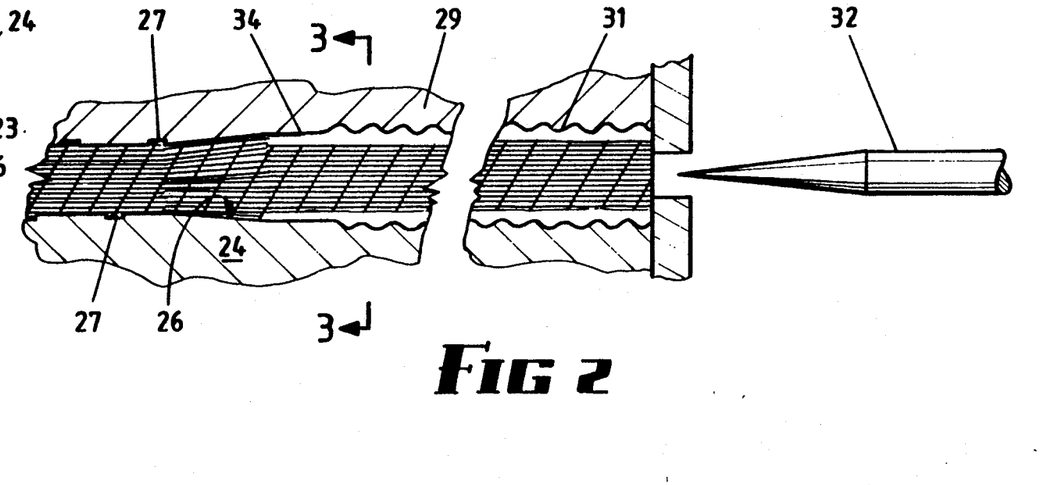
FIG. 2 is a longitudinal section illustrating the open die before a rod is inserted therein.
Figure 5:
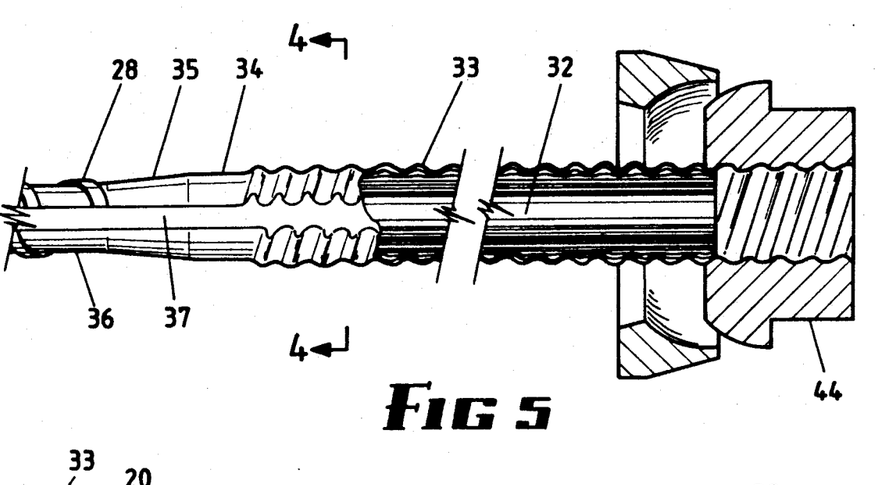
FIG. 5 is a longitudinal section through the fastener, FIG. 5 showing the section plane 4—4 of FIG. 4, but not the die.
Figure 6:
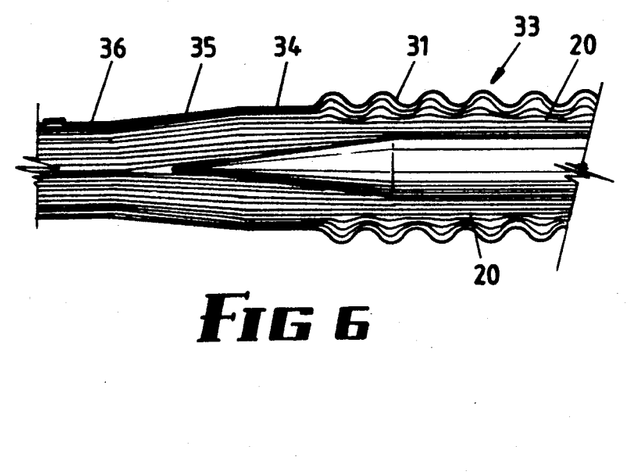
FIG. 6 is a fragmentary longitudinal section showing portion of the shape of the enlarged threaded fastener end to a larger scale than FIG. 5.

A male insert 32 is inserted into an end of wetted cable 23 after the die is closed. In FIGS. 2, 5 and 6, a cylindrical insert is used. This has the effect of forcing the formerly straight glass fiber strands 20 up into the female thread form to partly conform to its contours. Although the insert can subsequently be removed and be replaced by settable resin, it is preferred that the insert should remain in the rod after molding, and desirable but not essential that the cross-sectional area of the insert be such that the cross-section of fiber reinforced plastic in the annulus surrounding the insert should equal the cross-sectional area of the shank of the fastener.

The resin is allowed to set under pressure. FIGS. 5 and 6 illustrate the enlarged threaded end 33 of the fastener, and the thread terminates in a short parallel portion 34 of the fastener, which itself merges into a tapered portion 35, and finally a parallel portion 36 from which the projections 28 are outstanding. Tests have indicated that this arrangement reduces incidence of stress concentration failure in the fastener, since there is a smooth transition of direction of glass fibers strands 20.

Figure 3:
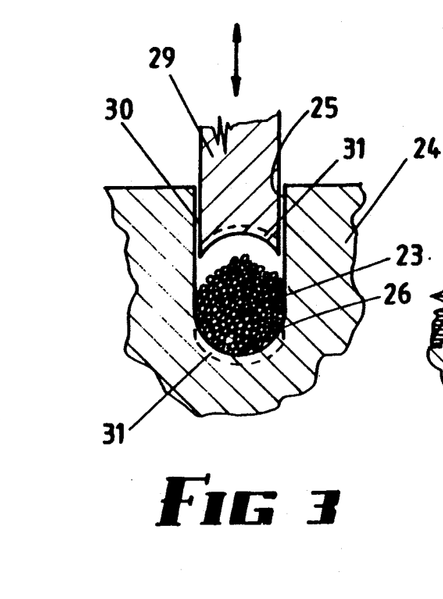
FIG. 3 is a section on line 3—3 of FIG. 2, wherein the die is a two-part die.
Figure 4:
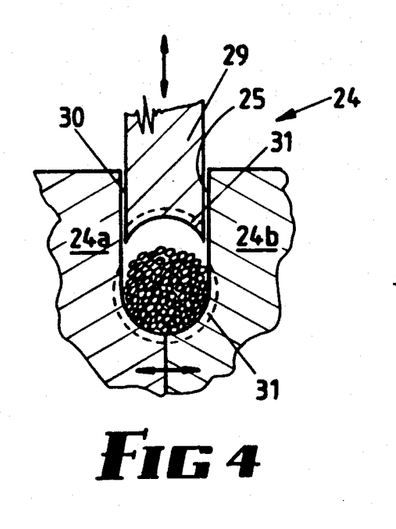
FIG. 4 is a cross-section showing a three-part die.

If the effective die surfaces are merely "half round", an expulsion of fibers can occur at the part plane as the die closes in prior art dies (excepting at the end yet to be expanded). However, the arrangement shown in FIGS. 3 and 4 avoids this danger, but results in two flat areas designated 37 in FIG. 5, and the existence of these areas enables removal of the fastener to be effected from the die 24 when opened. The flats also assist in grouting the shank in a bore hole, in that settable resin or grouting material can flow over the flats in an axial direction. There is however a further advantage. As said, where the thread form 31 exists in the rod end, the reinforcing fibers 20 partly follow the thread contours (FIG. 6). If a full circumscribing thread 31 is required, without interruption by the flats 37, a three part die may be used as shown in FIG. 4. The open die 24 comprises two portions 24a and 24b which are laterally separable to allow release of the threads 31 and project ions 28. Alternatively, the die may be as shown in FIG. 3 for the length of the shank, but may include a conventional die portion at the threaded end where the diameter of the cable is expanded, since pressure is not applied at that end until after the die is closed.

FIG. 6 illustrates to a much larger scale the form of the thread 31 wherein the wetted fibers 20 will be seen to have taken a shape approximately corresponding to the outer surface of the thread.

Figure 7:
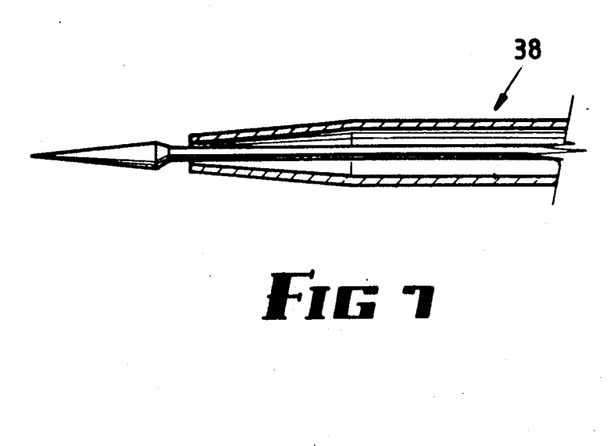
FIG. 7 is a cross-section through a tubular injecting head which may be used for injecting a settable polymeric insert into the rod end.

FIG. 7 illustrates an injecting head 38 insertable into an end of cable 23 in the same way as dowel 32. If settable polymeric material is injected through the head 38, and the head withdrawn, the settable material remains as a male insert in the space created by head 38. An advantage of this method is that the settable material can be injected at high pressure, and further assist entry of the fibers 20 into the voids of the female thread form 31 under hydraulic pressure which is unlikely to damage the fibers.

Figure 8:
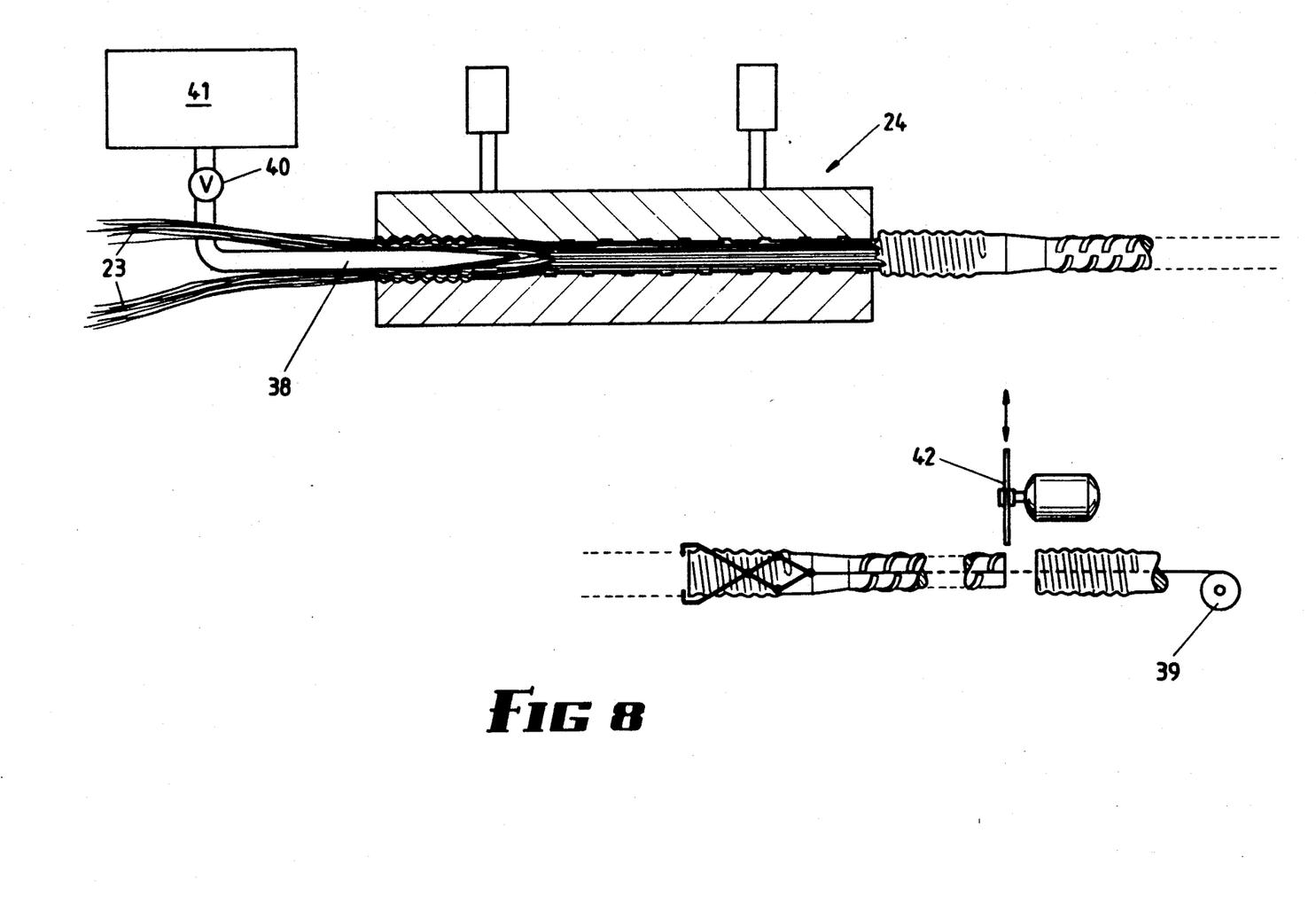
FIG. 8 shows diagrammatically a production installation.

FIG. 8 is a diagrammatic representation of a production line wherein, after molding and setting of a fastener in a three part die 24 as set forth above and illustrated in FIG. 4, the three parts 24a, 24b and 29 are separated, the set fastener is drawn out of the die 24 by windlass 39, and a further portion of wetted cable 23 (in two parts) is drawn into die 24 before its reclosure. Injection head 38 is inserted into the entry end of die 24 after closure of die 24 but before setting of the resin, valve 40 is opened to inject a settable dough molding compound through head 38, from pressure vessel 41 (or an equivalent, e.g. accumulator). After setting and withdrawal from die 24, the resin continues to cure until it has hardened sufficiently to be severed by saw 42.

Figure 9:
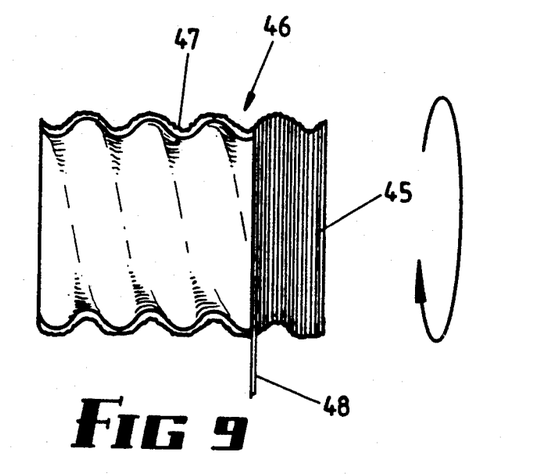
FIG. 9 is a longitudinal section illustrating a first stage of production of a fiber reinforced polymeric nut.
Figure 10:
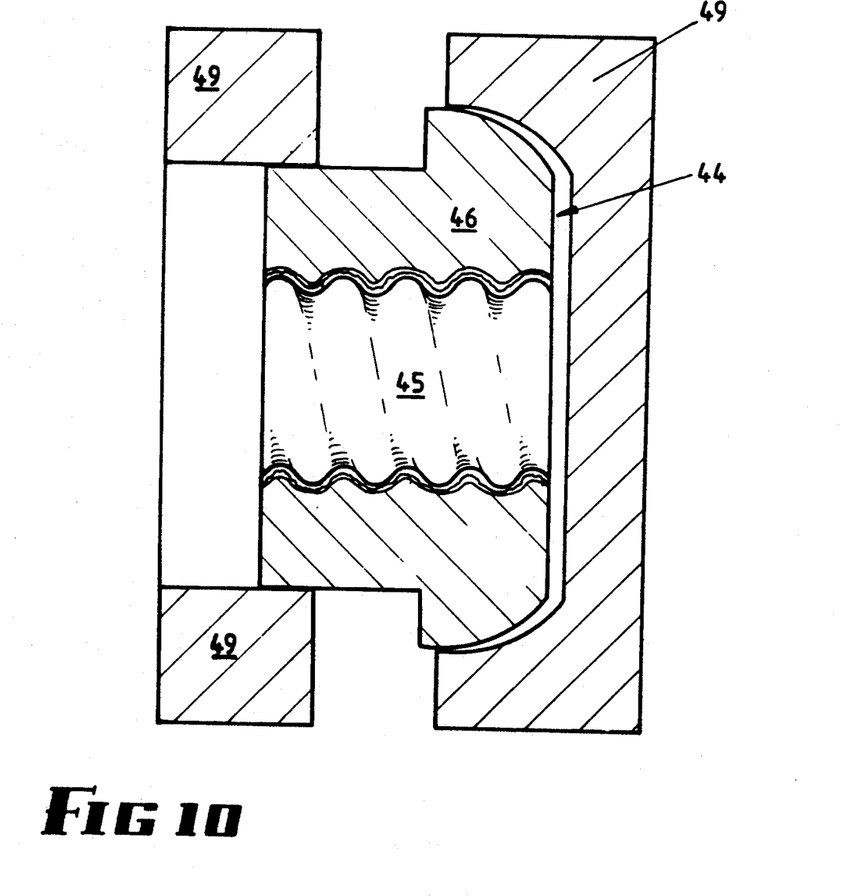
FIG. 10 is a longitudinal section illustrating a further stage of the nut production.

FIGS. 9 and 10 illustrate the production of a nut 44 (also shown in FIG. 5). In FIG. 9 a mandrel 45 is provided with a thread form 46 corresponding to the thread form 31 but having a very slightly greater pitch. A layer of woven reinforcement material 47 is laid up over the mandrel 45, with the warp threads extending longitudinally and the weft threads extending circumferentially. The warp threads should be of sufficient strength to provide the longitudinal reinforcement for the screw thread. The nut of course is also subject to considerable hoop stress, and to provide hoop stress reinforcement a strand 48 is wound in spiral fashion over the woven reinforcement material 47.

The external nut shape is achieved in a pressure die 49, the die 49 being closed over added dough molding compound, sheet molding compound, or catalyzed resin 46 which overlies the reinforced thread, and the mandrel 45 is removed (after the resin is at least partly cross-linked). The reinforced nut is arranged to have a slightly less modulus of elasticity than the reinforced rod so that the load applied will be more evenly spread over the length of the nut. Alternatively, the nut may be made slightly longer and molded from dough or sheet molding compound.

FIGS. 12 and 13 illustrate alternative shapes and configurations of the ribs 26 on a shank of an elongate fastener which can be used in mining operations. The ribs 26 are part-helical, discontinuous and staggered, and alternately right/left hand helical. Thus when the ingredients of a two-pot mix cement are located in a hole in a wall of a mine shaft, for example, sometimes in the form of a "sausage", and the shank is also inserted and rotated, the fluid is "split" into a large number of streams, and subsequently rejoined, and this enhances mixing, so that failure of cement is unlikely to occur. In FIG. 13, helixes of the same hand are shown, and the projections 28 "pump" fluid, or semi-fluid, of the cement (grout) into the hole and reduce spillage. The same hand helixes extend for a short distance only along the shank.

Figure 14:
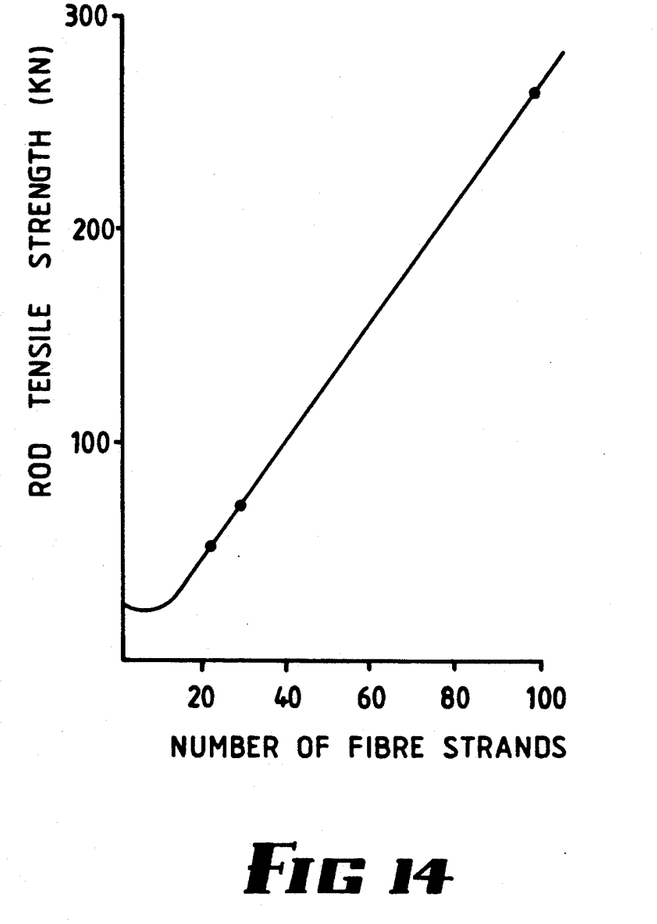
FIG. 14 illustrates a relationship which exists between the number of strands and tensile strength of a rod.

FIG. 14 shows the advantage of using a large number of fibers, and in a glass fibers/polyester combination it is desirable to have not less than 10%, but not more than 80% fiberglass by weight of the rod 23.

Figure 15:
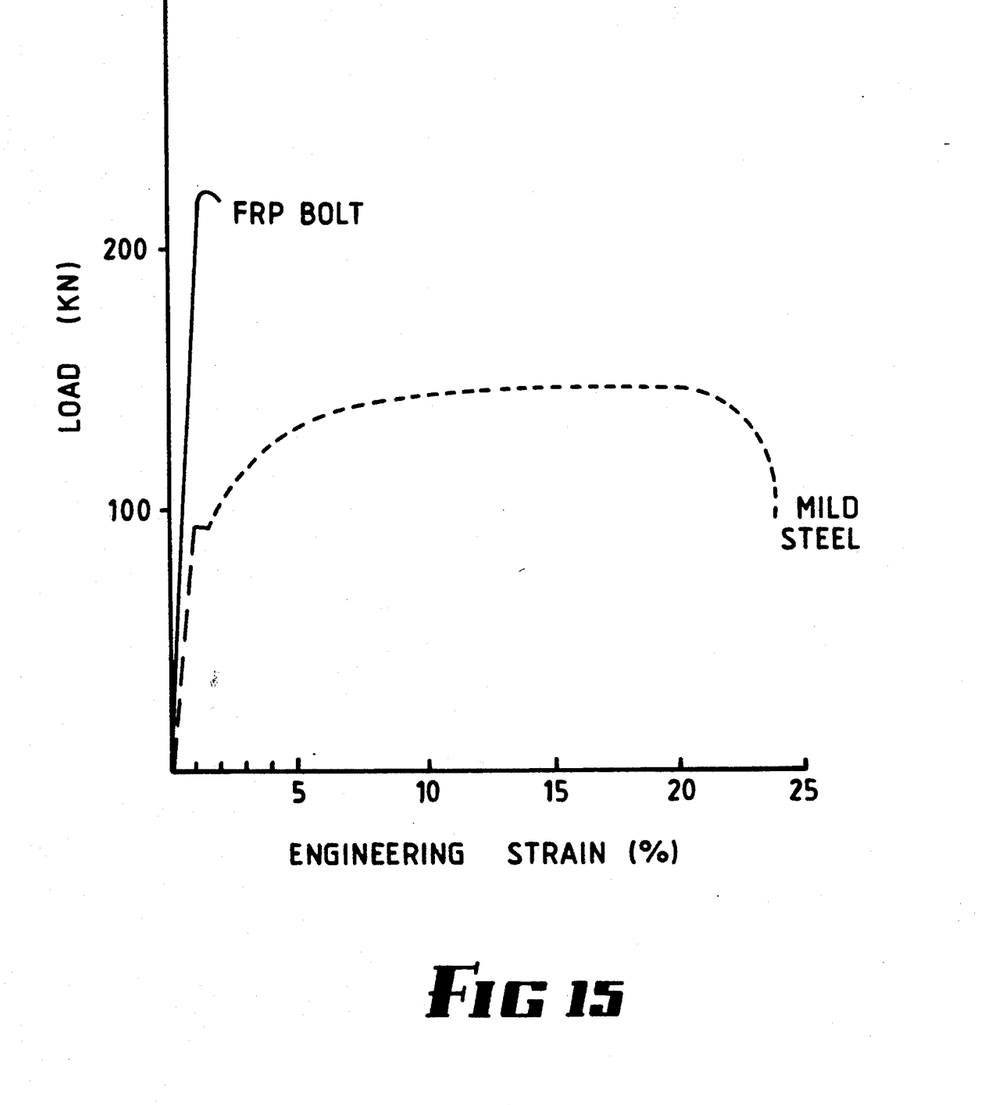
FIG. 15 illustrates a stress/strain relationship of a rod according to this embodiment, compared with a mild steel rod of equal cross-sectional area.

FIG. 15 illustrates that the shanks of threaded rods made in accordance with this invention can have strengths which are at least comparable with mild steel nuts and bolts.

Figure 16:
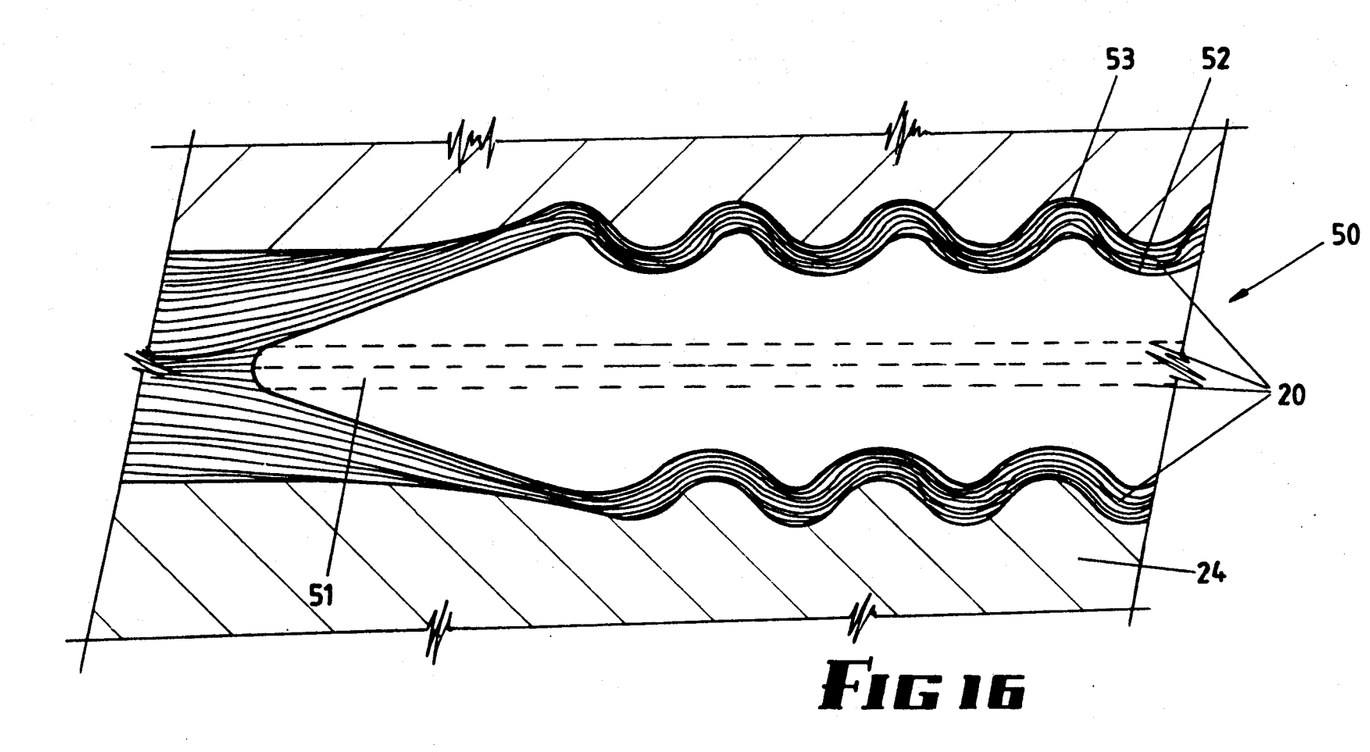
FIG. 16 illustrates diagrammatically the expansion of a rod end over a threaded insert.

In the arrangement of FIG. 16, a male insert 50 has a tapered leading end 51 (as in the case of dowel 31), and the outer surface 52 of the insert 50 has a thread form of the same pitch, but smaller diameter, than the required outer surface 53 of the thread to be formed.

The cable is placed into die 24, which is closed, and the insert 50, with or without additional strands wound over the outer surface 53, is screwed into the cable end, whereby the cable is forced out into the conformations of the die 24, and the reinforcing fibers at least partly conform to the thread shape. This method again retains the constant cross-sectional area of the fiber reinforced plastics. The fiber displacement into the thread form is particularly consistent with this method, and the resin/fibre matrix remains substantially void-free.

While the above embodiment has been specifically described with respect to a product useable as a rock bolt, quite obviously the invention can be applied to threaded fasteners used for other purposes.

We claim:

1. A method of producing a fiber reinforced polymeric fastener having fastener surfaces at one end, comprising the following steps:
   (a) wetting out a plurality of reinforcing fibers with polymeric thermoset resin,
   (b) drawing the wetted fibers together to form a wetted coherent cable,
   (c) inserting the wetted coherent cable at least partly into a recess in a 'U' section molding die first part, said recess having parallel inner side walls and a first concave die surface in a base portion joining the inner side walls, the base portion comprising matching contours of said fastening surfaces near one end of the recess,
   (d) closing a second movable part of said molding die with respect to said first part, said second part having outer side walls which slidably engage the parallel inner side walls of the recess and a second concave die surface joining said parallel outer side walls, said second die surface also comprising matching countours of said fastening surfaces at said one end, applying pressure between the die parts to conform the resin to said matching countours, and cause the fibers to at least partly conform with said matching contours, and
   (e) setting, the resin opening the molding die, and removing the fastener from the die.

2. A method according to claim 1 wherein said die is a two part die and transverse widths of said matching contours do not exceed the transverse distance between said inner side walls, the method comprising forming said fastener to have two flat surfaces contiguous with said inner side walls, and removing the fastener from the die between the inner side walls in a direction parallel to those side walls.

3. A method according to claim 1 wherein said die first part itself comprises two portions which are separable about a plane located centrally between and parallel to said inner side walls, the transverse widths of said matching contours exceeding the transverse distance between said inner side walls, the method comprising forming said fastener to have fastening surfaces fully circumscribing the fastener, and removing the fastener from the die by separating the die parts and separating the portions of the first die part.

4. A method according to claim 3 further comprising removing the fastener from the die by applying tension to the fastener, thereby also drawing further said wetted coherent cable into space between the die parts, repeating the method to form and then remove a further fastener, and subsequently severing the first formed fastener from the further fastener.

5. A method according to claim 1 further comprising inserting a male inset into one end of the wetted coherent cable while in the die and when the die is closed so as to increase the diameter of that end and cause some fibers thereof to deflect into said matching contours.

6. A method according to claim 5 wherein said contours are contours of a thread and said male insert has a threaded outer surface of the same pitch as but smaller diameter than said contours, and comprising screwing the male insert into said end of the wetted coherent cable.

7. A method according to claim 3 wherein said male insert is a dowel, and comprising forcing the dowel into the cable end in an axial direction.

8. A method according to claim 3 wherein said male insert has a screw threaded outer surface, and comprising screwing the insert into the cable end.

9. A method according to claim 3 comprising inserting an injection head into said cable end, injecting a settable polymeric material through the injecting head and into said cable end, and withdrawing the injection head.

10. A method according to claim 1 wherein each said die surface also comprises matching contours of helical projections, and comprising forming said fastener to have a shank with a plurality of helical projections each of which extends at least part way around the shank.

11. A method according to claim 10 wherein alternate projection contours of some at least of said contours have opposite helix orientations.

12. A method according to claim 10 wherein some at least of adjacent said projection contours have the same helix orientations.

13. A method according to claim 1 wherein some at least of said matching contours are contours of a thread.

14. A method according to claim 13 wherein the profile of said thread contours is generally sinusoidal.

* * * * *